(12) United States Patent
Wang et al.

(10) Patent No.: US 9,328,008 B2
(45) Date of Patent: May 3, 2016

(54) SUPERCRITICAL WATER OXIDATION TREATMENT SYSTEM FOR ORGANIC WASTEWATER WITH HIGH SALINITY

(71) Applicant: XI'AN JIAOTONG UNIVERSITY, Xi'an, Shaanxi (CN)

(72) Inventors: Shuzhong Wang, Shaanxi (CN); Donghai Xu, Shaanxi (CN); Xingying Tang, Shaanxi (CN); Yanmeng Gong, Shaanxi (CN); Jie Zhang, Shaanxi (CN); Yuzhen Wang, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 0 days.

(21) Appl. No.: 14/396,732

(22) PCT Filed: Dec. 5, 2012

(86) PCT No.: PCT/CN2012/085881
§ 371 (c)(1),
(2) Date: Oct. 23, 2014

(87) PCT Pub. No.: WO2013/159529
PCT Pub. Date: Oct. 31, 2013

(65) Prior Publication Data
US 2015/0128642 A1    May 14, 2015

(30) Foreign Application Priority Data

Apr. 23, 2012   (CN) .......................... 2012 1 0120217

(51) Int. Cl.
| | | |
|---|---|---|
| C02F 11/08 | (2006.01) | |
| C02F 1/38 | (2006.01) | |
| C02F 9/00 | (2006.01) | |
| C02F 1/20 | (2006.01) | |
| C02F 5/00 | (2006.01) | |
| C02F 1/52 | (2006.01) | |
| F25J 1/00 | (2006.01) | |

(52) U.S. Cl.
CPC ............... *C02F 11/086* (2013.01); *C02F 1/385* (2013.01); *C02F 9/00* (2013.01); *C02F 1/20* (2013.01); *C02F 5/00* (2013.01); *C02F 11/08* (2013.01); *C02F 2001/5218* (2013.01); *F25J 1/0002* (2013.01)

(58) Field of Classification Search
CPC .............. C02F 1/20; C02F 1/385; C02F 5/00; C02F 9/00; C02F 11/08; C02F 11/086; C02F 2001/5218; F25J 1/0002
See application file for complete search history.

(56) References Cited

U.S. PATENT DOCUMENTS 6,103,129 A * 8/2000 Bond ..................... C02F 11/086
210/721

* cited by examiner

*Primary Examiner* — Lucas Stelling

(57) ABSTRACT

A supercritical water oxidation treatment system for organic wastewater with a high salinity crystallizes high-salinity wastewater by a low temperature of liquid oxygen, and decreases an inorganic salt content in the wastewater. Under supercritical water conditions, a hydrocyclone (4) separates most precipitated solid salts in the wastewater, so effectively prevents pipes and the tubular reactor (22) after the hydrocyclone (4) from plugging. Inorganic salts are able to be continuously separated from the system by the hydrocyclone (4) at the bottom of a desalination device, In addition, excess oxygen and gaseous products $CO_2$ are recovered by a separation recovery part. The reaction time and the reaction temperature of supercritical water oxidation reaction are lowered due to the installation of a simple post-treatment unit (37). Moreover, the heat of the reactor effluent with a high temperature is recovered in the system, so operation cost of the system is reduced evidently.

8 Claims, 1 Drawing Sheet

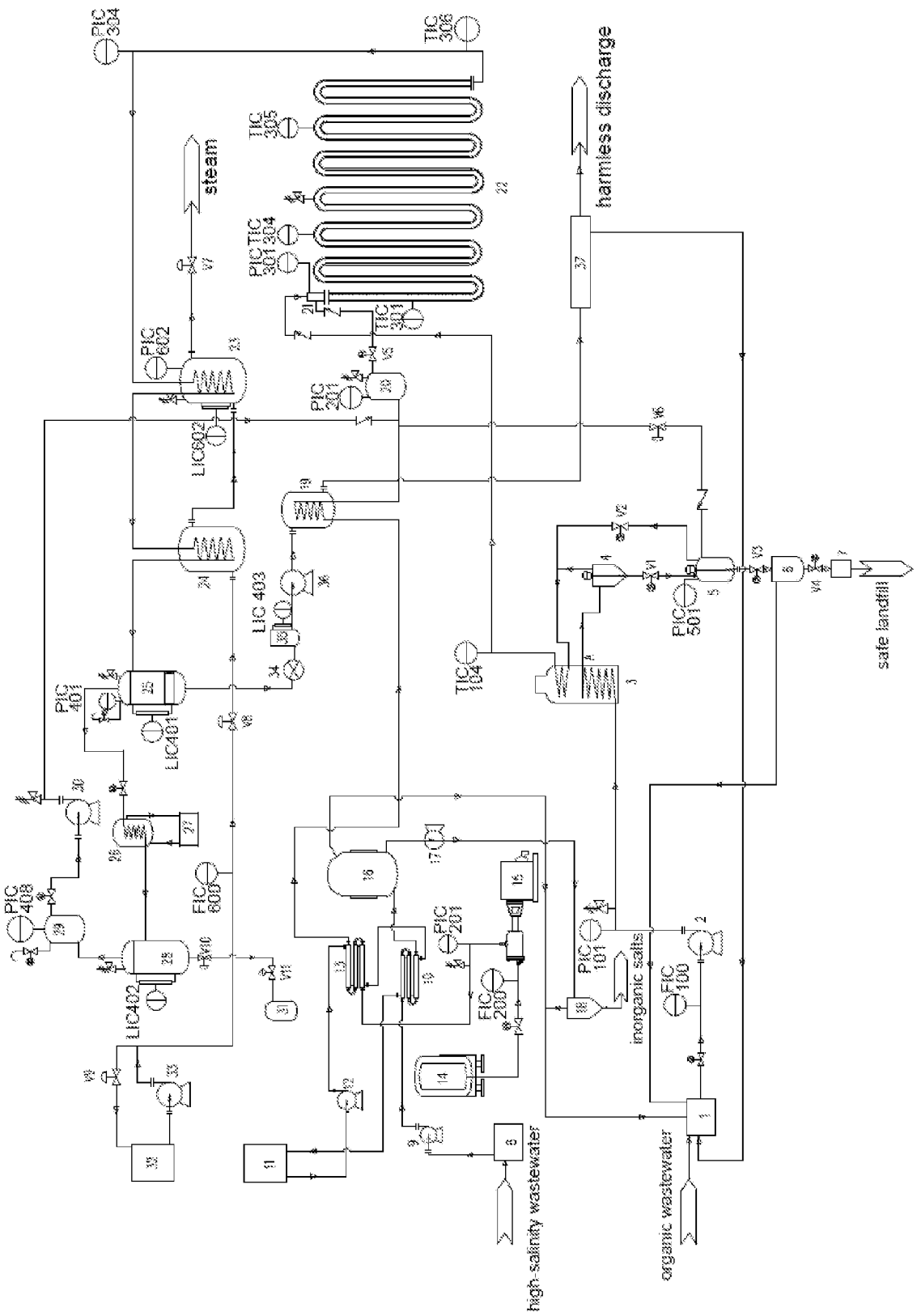

`US 9,328,008 B2`

SUPERCRITICAL WATER OXIDATION TREATMENT SYSTEM FOR ORGANIC WASTEWATER WITH HIGH SALINITY

CROSS REFERENCE OF RELATED APPLICATION

This is a U.S. National Stage under 35 U.S.C 371 of the International Application PCT/CN2012/085881, filed Dec. 5, 2012, which claims priority under 35 U.S.C. 119(a-d) to CN 201210120217.7, filed Apr. 23, 2012.

BACKGROUND OF THE PRESENT INVENTION

1. Field of Invention

The present invention relates to an harmless treatment system for an organic wastewater with a high salinity (wherein an inorganic salt content is 5 wt %-30 wt %), wherein supercritical water is utilized as a reaction medium.

2. Description of Related Arts

The supercritical water is the special-status water whose temperature and pressure are both above critical point of water (wherein T=374.15° C., P=22.12 MPa). The supercritical water has the properties of both liquid and gaseous water, and only a small amount of hydrogen bonds exist under this condition. Therefore, a dielectric constant of the supercritical water is similar to that of the polar organic solvent, and the supercritical water has a high diffusion coefficient and a low viscosity. Organics, oxygen and the supercritical water are soluble in each other, in such a manner that heterogeneous reactions become homogeneous reactions, which greatly reduces the mass transfer resistance. However, inorganic salt has a very low solubility in supercritical water, and is easy to be separated.

Supercritical water oxidation (SCWO) takes advantage of a special property that the supercritical water is a good solvent for both organics and oxidant. With adequate oxidants, organics in an oxygen-rich environment homogeneously react, which rapidly and completely destroys the organics and transforms them into harmless small molecule compounds such as $H_2O$ and $CO_2$, and inorganic salts. SCWO is mainly applied in efficiently harmless treatment for organic wastewater with a high toxicity, a high concentration, and a low biochemical degradability, which has no secondary pollution, is able to achieve heat self-sufficiency, costs less in the case of energy recovery and optimization, has economic advantages, and has a promising future in terms of displacing the conventional incineration method. Thus, the development of SCWO attracts the attention of the whole world. "Energy and environment", as one of the six key areas of the US national technologies, points out that one of the most promising organic waste treatment technology of the 21st century is the supercritical water oxidation technology. Currently, there are a small number of commercial SCWO devices running in some countries, but most are still in experimental stages and only a few pilot scale devices are developed.

Organic wastewater with a high concentration and a low biochemical degradability (such as pesticide wastewater) usually comprises a large amount of inorganic salts up to 5 wt %-30 wt %, wherein some inorganic salts have recycling values. However, the solubility of the inorganic salt is significantly low in the supercritical water, typically less than 100 mg/L. For example, the solubility of $Na_2SO_4$, $CaCl_2$, NaCl or KCl in supercritical water at 400° C., 25 MPa is less than 1 g/L. Viscous salts in supercritical water oxidation of organic wastewater will precipitate and deposit on the reactor surface. When the salt deposition is out of control, the reactor will be plugged. Especially, when viscous salts with larger particles precipitate at a low flow rate condition, the reactor is more likely to be plugged. And when this happen, the entire device must be shut down, washed and restarted, which reduces the reliability of the SCWO device and increases its operation cost. In addition, the deposition of the inorganic salts, in particular those containing chlorine ions, will increase the corrosion rates of the reactor, pipes and other parts, and result in heat transfer deterioration of a heat exchanger surface. The environment with high temperature, high pressure and high oxygen content increases the operation cost of the SCWO device. The above problems greatly hinder the application of SCWO.

In view of the complex feedstock characteristics and the harsh reaction conditions during SCWO of the organic wastewater, the conventional desalination methods (such as electrical dialysis, reverse osmosis, ion exchange, electrical adsorption) are difficult to be applied in the SCWO system for an organic wastewater with a high salinity. For the reliable operation of this SCWO system, the simpler, more efficient and more convenient desalination methods and equipments are needed. Therefore, for the development of the SCWO system for the organic wastewater with a high salinity, the reactor plugging caused by salt deposition should be solved, and the operation cost of SCWO should be effectively reduced.

SUMMARY OF THE PRESENT INVENTION

Objects of the present invention are to overcome problems of salt deposition and a high operation cost during SCWO of an organic wastewater with a high salinity, and to provide an improved SCWO system which is widely applicable in efficient and low-cost harmless treatment for the organic wastewater with the high salinity.

Accordingly, in order to accomplish the above objects, the present invention provides an SCWO system for an organic wastewater with a high salinity, which comprises: a pre-desalination part, a supercritical water desalination part, a mix reaction part, and a separation recovery part.

Herein, the pre-desalination part comprises a first tube heat exchanger and a second tube heat exchanger, wherein an inlet on a tube side of the first tube heat exchanger is injected with the wastewater with the high salinity, an outlet on the tube side of the first tube heat exchanger is connected to an inlet of a cooling crystallization device, a top outlet of the cooling crystallization device is connected to an inlet of a storage tank with organic wastewater, a bottom outlet of the cooling crystallization device is connected to an inlet of a filter centrifuge, a top outlet of the filter centrifuge is connected to the storage tank, a bottom outlet of the filter centrifuge discharges salts; an glycol solution is injected through a shell side of the first tube heat exchanger and a shell side of the second tube heat exchanger, liquid oxygen is injected through an inlet at a tube side of the second tube heat exchanger.

The supercritical water desalination part comprises a heating furnace, wherein an inlet of the heating furnace is connected to an outlet of the storage tank, a middle outlet of the heating furnace is connected to an inlet of a hydrocyclone, a top outlet of the hydrocyclone is connected to a middle inlet of the heating furnace, an outlet of the heating furnace is connected to an inlet of a mixer, a bottom outlet of the hydrocyclone is connected to a desalination device.

The mix reaction part comprises a first volume heat exchanger, wherein an inlet on a tube side of the first volume heat exchanger is connected to an outlet on a tube side of a second volume heat exchanger, an outlet on the tube side of the first volume heat exchanger is connected to an inlet of a first buffer, an outlet of the first buffer is connected to an inlet of a mixer, an outlet of the mixer is connected to an inlet of a tubular reactor, an outlet of the tubular reactor is connected to an inlet on a tube side of a volume heat exchanger.

The separation recovery part comprises a high-pressure gas-liquid separator, wherein an inlet of the high-pressure gas-liquid separator is connected to an outlet on the tube side of the volume heat exchanger, a top outlet of the high-pressure gas-liquid separator is connected to an inlet on a tube side of a fourth volume heat exchanger, an outlet on the tube side of the fourth volume heat exchanger is connected to an inlet of a purification tower, a top outlet of the purification tower is connected to an inlet of a second buffer, an outlet of the second buffer is connected to an inlet of a high-pressure compressor, an outlet of the high-pressure compressor is connected to the inlet of the first buffer; a bottom outlet of the high-pressure gas-liquid separator is connect to an inlet on a shell side of the first volume heat exchanger, an outlet on the shell side of the first volume heat exchanger is connected to a post-treatment unit; an inlet on a shell side of the volume heat exchanger is connected to a water softening device; an outlet on the shell side of the volume heat exchanger set outputs steam; an bottom outlet of the purification tower discharges $CO_2$.

Preferably, the above system is embodied as follows.

The water softening device comprises a softened water tank, wherein an outlet of the softened water tank is connected to the inlet on the shell side of the volume heat exchanger set through a low-voltage frequency conversion pump, the outlet on the shell side of the volume heat exchanger set outputs the steam. A volume heat exchanger group comprises two volume heat exchangers connected in series.

The desalination device comprises a buffer oxidizer, wherein a top inlet of the buffer oxidizer is connected to the bottom outlet of the hydrocyclone, a bottom outlet of the buffer oxidizer is connected to a top inlet of an expansion device, a bottom outlet of the expansion device is connected to a top inlet of a salt storage pool, a bottom outlet of the salt storage pool discharges inorganic salts.

The bottom outlet of the high-pressure gas-liquid separator is connected to the inlet on the shell side of the first volume heat exchanger through a back pressure valve, a unsealed liquid tank and a low-pressure water pump.

A sludge outlet end of the post-treatment unit is connected to the inlet of the storage tank through a linking pipe.

The outlet on the tube side of the first volume heat exchanger is also connected to the top inlet of the buffer oxidizer.

A top outlet of the buffer oxidizer is connected to the top outlet of the hydrocyclone.

Compared with conventional technologies, the present invention has advantages as follows.

1) Two streams of organic wastewaters with salts are fed for supercritical water oxidation treatment. One stream of the organic wastewater has a salinity of 10 wt %-30 wt % (which is called a high-salinity wastewater for short), wherein solubilities of inorganic salts therein decrease when a temperature decreases, and a content of the inorganic salts is one third of a total amount of the organic wastewater. Another stream of the organic wastewater has a salinity of 5 wt %-10 wt %. The high-salinity wastewater is cooled and crystallized by liquid oxygen in the system for reducing the salinity of the wastewater, thereby reducing a salinity of inorganic salts to 5 wt %-10 wt % in a mixed wastewater formed by mixing the two streams of wastewaters. The mixed wastewater is pressurized by a high-pressure metering pump and then sent to the heating furnace for pre-heating. A heat exchanging coil tube of the heating furnace in the system is arranged in two sections (a high temperature section and a low temperature section). Fluid at an outlet of the low temperature section (namely the middle outlet of the heating furnace) reaches a supercritical temperature. After entering the hydrocyclone, most solid salts with a particle size more than 10 μm in reaction fluid are separated by centrifuging. After salts removal, the fluid enters the high temperature section of the heating furnace through the top outlet of the hydrocyclone, so as to ensure a heat exchanging coefficient of the heat exchange coil at the high temperature section, and effectively prevent pipes and reactors following the hydrocyclone from plugging. At the same time, solid inorganic salts separated at the bottom of the hydrocyclone are spirally sent to the buffer oxidizer by a motor installed on the hydrocyclone. When the buffer oxidizer is full of the solid inorganic salts, a cut-off valve at the top inlet of the buffer oxidizer is closed, the motor installed on a top portion of the hydrocyclone is closed, a bottom cut-off valve of the buffer oxidizer is slowly opened, and a spirally transporting motor installed on the buffer oxidizer is started, for transporting the solid inorganic salts in the buffer oxidizer to the expansion device. A fluid containing the solid inorganic salts expands in the expansion device. Steam generated enters the storage tank. Heat generated is recycled. The separated solid inorganic salts enter the salt storage, and are taken out for further landfill at a certain period. In addition, after being spirally sent into the buffer oxidizer, the fluid with a high salinity separated by the hydrocyclone reacts with oxidation previously injected through an oxygen pipe, which harmlessly removes organic pollutants. After the supersaturated fluid with a high salinity enters the buffer oxidizer, the solid inorganic salt will deposit at the bottom of the buffer oxidizer. Supercritical fluid at a top of the buffer oxidizer, which hardly contains solid inorganic salts, enters the top outlet of the hydrocyclone.

Therefore, the system cools and crystallizes the high-salinity wastewater by the liquid oxygen, for reducing the salinity of the mixed wastewater, and desalinating by the hydrocyclone according to characteristics of the supercritical water, which effectively prevents devices such as the pipes and the reactor following the hydrocyclone from plugging.

2) In order to reduce the operation cost of the SCWO system for the organic wastewater with the high salinity, the system cools and crystallizes the high-salinity wastewater by the liquid oxygen, for recycling inorganic salts which may be valuable, so as to generates economic benefits. For ensuring a high removal efficiency of organics, the system adopts a high oxidation coefficient (3.0-4.0). With the help of the fourth volume heat exchanger, a cooling unit, the purification tower, the second buffer, and the high-pressure compressor, excess oxygen is separated and recycled, and separated liquid $CO_2$ may be sold for some benefits. By utilizing the softened water tank, the low-pressure frequency conversion pump, the second volume heat exchanger, and a third volume heat exchanger, heat of high-temperature fluid after reaction is exchanged for generating saturated steam, wherein the saturated steam is outputted for benefits. The removal efficiency of SCWO for organic wastewater is reduced if a reaction time and a reaction temperature decrease, while simple post-treatment units are helpful. With discharge requirements of the mixed wastewater after overall treatment being satisfied, system operation costs are effectively reduced. Coupled application of the above methods is able to effectively decrease the operation costs of the supercritical water oxidation treatment system for the organic wastewater with the high salinity.

These and other objectives, features, and advantages of the present invention will become apparent from the following detailed description, the accompanying drawings, and the appended claims.

BRIEF DESCRIPTION OF THE DRAWINGS

The FIGURE is a structural schematic diagram of a supercritical water oxidation treatment system according to a preferred embodiment of the present invention.

Reference numbers: 1—storage tank, 2—high-pressure metering pump, 3—heating furnace, 4—hydrocyclone, 5—buffer oxidizer, 6—expansion device, 7—salt storage pool, 8—high-salinity wastewater tank, 9—low-pressure pump, 10—first tube heat exchanger, 11—glycol solution tank, 12—low-pressure centrifugal pump, 13—second tube heat exchanger, 14—liquid oxygen container, 15—liquid oxygen pump, 16—cooling crystallization device, 17—membrane pump, 18—filter centrifuge, 19—first volume heat exchanger, 20—first buffer, 21—mixer, 22—tubular reactor, 23—second volume heat exchanger, 24—third volume heat exchanger, 25—high-pressure gas-liquid separator, 26—fourth volume heat exchanger, 27—cooling unit, 28—purification tower, 29—second buffer, 30—high-pressure compressor, 31—$CO_2$ tank, 32—softened water tank, 33—low-pressure frequency conversion pump, 34—back pressure valve, 35—unsealed liquid tank, 36—low-pressure water pump, 37—post-treatment unit, V1-V5—electrical cut-off valve, V6-V10—electrical adjusting valve, V11—electrical pressure-reducing valve.

Legends and instrumentation codes in FIG. 1 are shown in Table 1.

TABLE 1

| Legend | Name | Legend | Name | Code | Meaning |
|---|---|---|---|---|---|
| (M) Electrical cut-off valve | | Check valve | | | Safe valve |
| | Electrical adjusting valve | | Vent pipe | F IC | Flow rate display |
| | Electrical pressure-reducing valve | | Cross pipe | T IC | Temperature display |
| | Flange connector | | Intersection pipe | P IC | Pressure display |
| | Fluid direction | | Input or output | L IC | Level display |

DETAILED DESCRIPTION OF THE PREFERRED EMBODIMENT

Referring to FIG. 1, an outlet of a storage tank 1 is connected to an inlet of a high-pressure metering pump 2, and an outlet of the high-pressure metering pump 2 is connected to an inlet of a heat furnace 3, and a middle outlet of the heating furnace 3 is connected to an inlet of a hydrocyclone 4, and a top outlet of the hydrocyclone 4 is connected to a middle inlet of the heating furnace 3, and an outlet of the heating furnace 3 is connected to an inlet of a mixer 21. An outlet of a high-salinity wastewater tank 8 is connected to an inlet of a low-pressure pump 9, and an outlet of the low-pressure pump 9 is connected to an inlet on a tube side of a first tube heat exchanger 10, and an outlet on the tube side of the first tube heat exchanger 10 is connected to an inlet of a cooling crystallization device 16, and a top outlet of the cooling crystallization device 16 is connected to an inlet of the storage tank 1, and then a bottom outlet of the cooling crystallization device 16 is connected to an inlet of a filter centrifuge 18. An outlet of a glycol solution tank 11 is connected to an inlet of a low-pressure centrifugal pump 12, an outlet of the low-pressure centrifugal pump 12 is connected to a second tube heat exchanger 13, an outlet on a shell side of the second tube heat exchanger 13 is connected to an inlet on a shell side of the first tube heat exchanger 10, an outlet on the shell side of the first tube heat exchanger 10 is connected to an inlet of the glycol solution tank 11. An inlet of a liquid oxygen pump 15 is connected to a liquid oxygen container 14, and an outlet of the liquid oxygen pump 15 is connected to an inlet on a tube side of the second tube heat exchanger 13, and an outlet on the tube side of the second tube heat exchanger 13 is connected an inlet on a tube side of a first volume heat exchanger 19, and an outlet on the tube side of the first volume heat exchanger 19 is connected to an inlet of a first buffer 20, and then an outlet of the first buffer 20 is connected to the inlet of the mixer 21. An outlet of the mixer 21 is connected to an inlet of a tubular reactor 22, and an outlet of the tubular reactor 22 is connected to an inlet on a tube side of a second volume heat exchanger 23, and then an outlet on the tube side of the second volume heat exchanger 23 is connected to an inlet on a tube side of a third volume heat exchanger 24, and an outlet on the tube side of the third volume heat exchanger 24 is connected to an inlet of a high-pressure gas-liquid separator 25, and then a top outlet of the high-pressure gas-liquid separator 25 is connected to an inlet on a tube side of a fourth volume heat exchanger 26, and an outlet on the tube side of the fourth volume heat exchanger 26 is connected to an inlet of a purification tower 28, and a top outlet of the purification tower 28 is connected to an inlet of a second buffer 29, and then an outlet of the second buffer 29 is connected to an inlet of a high-pressure compressor 30, and an outlet of the high-pressure compressor 30 is connected to the inlet of the first buffer 20. A bottom outlet of the high-pressure gas-liquid separator 25 is connected to an inlet of a back pressure valve 34, and an outlet of the back pressure valve 34 is connected to an inlet of a unsealed liquid tank 35, and an outlet of the unsealed liquid tank 35 is connected to an inlet of a low-pressure water pump 36, and an outlet of the low-pressure water pump 36 is connected to an inlet on a shell side of the first volume heat exchanger 19, and an outlet on the shell side of the first volume heat exchanger 19 is connected to an inlet of a post-treatment unit 37, and then an outlet of the post-treatment unit 37 harmlessly discharges liquid. A bottom outlet of the hydrocyclone 4 is connected to a top inlet of a buffer oxidizer 5, and a bottom outlet of the buffer oxidizer 5 is connected to a top inlet of an expansion device 6, and a bottom outlet of the expansion device 6 is connected to a top inlet of a salt storage pool 7, and inorganic salts discharged from a bottom outlet of the salt storage pool 7 is harmlessly buried. An outlet of a softened water tank 32 is connected to an inlet of a low-pressure frequency conversion pump 33, an outlet of the low-pressure frequency conversion pump 33 is connected to an inlet on a shell side of the third volume heat exchanger 24, and an outlet on the shell side of the third volume heat exchanger 24 is connected to an inlet on a shell side of the second volume heat exchanger 23, and then an outlet on the shell side of the second volume heat exchanger 23 outputs steam.

Referring to FIG. 1, the outlet of the low-pressure frequency conversion pump 33 is also connected to an inlet of the softened water tank 32 through an electrical adjusting valve V9. Another outlet of the post-treatment unit 37, which discharges sludge, is connected to an inlet of the storage tank 1. Another outlet on the tube side of the first volume heat exchanger 19 is also connected to the top inlet of the buffer oxidizer 5. A top outlet of the buffer oxidizer 5 is connected to the top outlet of the hydro cyclone 4 through an electrical cut-off valve V2. An inlet on a shell side of the fourth volume heat exchanger 26 is connected to an outlet of a cooling unit 27, and an outlet on the shell side of the fourth volume heat exchanger 26 is connected to an inlet of the cooling unit 27.

A working principle of a supercritical water oxidation treatment system for organic wastewater with a high salinity (see FIG. 1) is as follows.

1) The high-salinity wastewater (inorganic salts dissolve in the wastewater, solubilities thereof decrease with the temperature decreasing. The wastewater contains the salt content of 10 wt %-30 wt %, and an amount thereof is about one third of a total amount of the wastewater) in a high-salinity wastewater tank 8 is sent to the tube side of the first tube heat exchanger 10 by the low-pressure pump 9 for being cooled by a glycol solution, and then enters the cooling crystallization device 16 for crystallizing and depositing at a bottom of the cooling crystallization device 16. The desalinated wastewater at a top of the cooling crystallization device 16 enters the storage tank 1 for being mixed with a wastewater with a salinity of 5 wt %-10 wt %, so reducing a salinity of the inorganic salts to 5 wt %-10 wt % in a mixed wastewater. Solid inorganic salts separated at a bottom of the cooling crystallization device 16 is transported to the filter centrifuge 18 through a membrane pump 17. Crystallized inorganic salts are separated from a bottom of the filter centrifuge 18 by a filter centrifugation effect. If components of the crystallized inorganic salts are relatively uniform, the crystallized inorganic salts may be sold for benefits. Fluid at a top of the filter centrifuge 18 enters the storage tank 1. The high-salinity wastewater is cooled by liquid oxygen in the system, and heat is exchanged by an intermediate heat-exchanging medium, which is the glycol solution. Details are: the glycol solution from the glycol solution tank 11 is transported by a low-pressure centrifugal pump 12 to the shell side of the second tube heat exchanger 13, and then is cooled by the liquid oxygen from the liquid oxygen pump 15, and then the glycol solution enters the shell side of the first tube heat exchanger 10 for cooling the high-salinity wastewater, finally the glycol solution returns the glycol solution tank 11.

Therefore, a temperature of the high-salinity wastewater is decreased by the liquid oxygen which is utilized as an oxidant in the system, so as to crystallize the inorganic salts. On one hand, the high-salinity wastewater is pre-desalinated, which decreases the salinity of the mixed wastewater, so as to decrease a plugging risk of the reactor in the system. On the other hand, the inorganic salts are separated by the low temperature oxygen in the system, and if the components of the crystallized inorganic salts are relatively uniform, they may be sold for benefits.

2) The mixed wastewater in the storage tank 1 is pressurized and transported to the low temperature section of the heating furnace 3 by the high-pressure metering pump 2 for pre-heating. By adjusting a heating power of the heating furnace 3, fluid at the middle outlet of the heating furnace 3 reaches a supercritical water temperature (about 400° C.). Then the fluid enters the hydrocyclone 4, and the precipitated inorganic salts under a supercritical condition are separated by a centrifugation effect of the hydrocyclone 4. After salts separation, the clean fluid enters the high temperature section of the heating furnace 3 for being further preheated. After reaching a set pre-heating temperature, the fluid is outputted from the outlet of the heating furnace 3, and enters the mixer 21.

Therefore, the mixed wastewater with the high salinity is pressurized by the high-pressure metering pump 2 and is preheated by the heating furnace 3 to reach a supercritical water status. The inorganic salts precipitate under the supercritical condition, and then the solid inorganic salts are separated by the centrifugation effect of the hydrocyclone 4. Most solid salts precipitated with a particle size more than 10 μm are separated. After salts removal, a salinity mass fraction is reduced about 90%. Then the fluid enters the high temperature section of the heating furnace 3 through the top outlet of the hydrocyclone 4, so as to ensure a heat exchanging coefficient of a heat exchange coil at the high temperature section, and effectively prevents pipes and devices (such as the mixer 21, and especially the reactor 22) following the hydrocyclone from plugging.

3) The liquid oxygen in the liquid oxygen storage 14 is pressurized and a flow rate thereof is adjusted by the liquid oxygen pump 15. The liquid oxygen enters the tube side of the second tube heat exchanger 13 and is vaporized after being preheated by the glycol solution at the shell side of the second tube heat exchanger 13. Then the oxygen enters the tube side of the first volume heat exchanger 19 and is preheated by the fluid with a low temperature (about 50° C.) after reaction at the shell side of the first volume heat exchanger 19, and then enters the first buffer 20. When a gas pressure PIC (201) reaches a system pressure, an electrical adjusting valve V6 is opened, and the oxygen enters the mixer 21 for being mixed with the preheated mixed wastewater.

Reaction fluid mixed in the mixer 21 enters the tubular reactor 22. After fully reacting in the tubular reactor 22, the reaction fluid with a high temperature enters the tube side of the second volume heat exchanger 23 for being cooled by softened water at the shell side of the second volume heat exchanger 23, and then enters the tube side of the third volume heat exchanger 24 for being cooled to about 50° C. by low-temperature softened water at the shell side of the third volume heat exchanger 24, and finally enters the high-pressure gas-liquid separator 25 for further gases and liquid separation. Excess oxygen separated at a top of the high-pressure gas-liquid separator 25 and gaseous products (mainly $CO_2$) enter the tube side of the fourth volume heat exchanger 26 for being further cooled by cooling water from the cooling unit 27 at the shell side of the fourth volume heat exchanger 26. After $CO_2$ is liquefied, the gas-liquid two phases fluid enters the purification tower 28. Oxygen at a top of the purification tower 28 enters the second buffer 29 before entering the high-pressure compressor 30. After being compressed by the high-pressure compressor 30, excess oxygen of after reaction is transported to the first buffer 20, so as to enter the tubular reactor 22 again for reacting. Liquid $CO_2$ at a bottom of the purification tower 28 is depressurized by an electrical pressure-reducing valve V11 and is then stored in a $CO_2$ tank 31. A liquid level of the purification tower 28 is controlled by adjusting an opening degree of an electrical adjusting valve V10.

Therefore, by the high-pressure gas-liquid separator 25, the fourth volume heat exchanger 26, the cooling unit 27, the second buffer 29, the high-pressure compressor 30, and the $CO_2$ tank 31, excess oxygen in the system is able to be separated and recycled to ensure a sufficient oxidation coefficient (about 3.0-4.0), which ensures a harmless removal efficiency of the supercritical water oxidation for the wastewater, and a low operation cost. In addition, a main gaseous product ($CO_2$) is separated and collected, which may be sold for benefits.

4) The fluid at a bottom of the high-pressure gas-liquid separator 25 enters the back pressure valve 34, so a pressure of the fluid is decreased to a normal pressure. The fluid after depressurized enters the unsealed liquid tank 35 for gaseous products separation. Then, the liquid is transported by the low-pressure water pump 36 to the shell side of the first volume heat exchanger 19 for preheating the oxygen at the tube side of the first volume heat exchanger 19, and then enters the post-treatment unit 37 for further simple treatments. The liquid is discharged after meeting corresponding requirements, and then a little amount of sludge generated in the post-treatment unit 37 enters the storage tank 1.

Therefore, the post-treatment unit 37 is installed in the supercritical water oxidation system, so that the high-salinity organic wastewater is treated under a relatively low temperature and a short reaction time. SCWO combined with a conventional treatment method is provided under a relatively low removal efficiency of organics, and this is able to not only meet drainage requirements but also effectively decrease the operation cost.

5) When an electrical cut-off valve V3 and the electrical adjusting valve V6 are closed, and electrical cut-off valves V1 and V2 are opened, solid inorganic salts separated at the bottom of the hydrocyclone 4 are spirally sent to the buffer oxidizer 5 by a motor installed on the hydrocyclone 4 and deposits to a bottom of the buffer oxidizer 5. The supercritical fluid at a top of the buffer oxidizer 5, which hardly contains solid inorganic salts, enters the top outlet of the hydrocyclone 4. When the buffer oxidizer 5 is full of the solid inorganic salts, a transporting motor on the top of the hydrocyclone 4 is closed, the electrical cut-off valves V1 and V2 at the top inlet of the buffer oxidizer 5 are closed, a bottom electrical cut-off valve V4 at the bottom outlet of the buffer oxidizer 5 is slowly opened, and a spirally transporting motor installed on the buffer oxidizer 5 is started to transport the solid inorganic salts in the buffer oxidizer 5 to the expansion device 6. The fluid contains the solid inorganic salts expands in the expansion device 6, and the generated steam enters the storage tank 1 to recover heat. The solid inorganic salts separated enter the salt storage pool 7. In addition, before the solid inorganic salts are transported to the buffer oxidizer 5, the electrical cut-off valves V1-V3 are closed, the electrical adjusting valve V6 is opened, so that oxygen is introduced to the buffer oxidizer 5 through the oxygen transportation pipe. Then, V1 and V2 are started. After being spirally sent into the buffer oxidizer 5, the fluid with a high salinity separated by the hydrocyclone 4 reacts with oxidant previously injected through the oxygen transportation pipe. This is able to harmlessly remove organic pollutants to ensure no organics in the inorganic salts in the salt storage pool 7. The inorganic salts are taken out from the salt storage pool 7 and conducted landfill periodically.

Therefore, with the help of the hydrocyclone 4, the buffer oxidizer 5, the expansion device 6, and the salt storage pool 7, the inorganic salts in the mixed wastewater are removed according to characteristics of the supercritical water. Thus, the inorganic salts are effectively removed before the mixed wastewater enters the tubular reactor 22, which is able to effectively prevent pipes and the tubular reactor 22 after the hydrocyclone 4 from plugging.

6) The softened water with the low temperature in the softened water tank 32 is transported by the low-pressure frequency conversion pump 33 to the shell side of the third volume heat exchanger 24 for cooling the reactor effluent at the tube side of the third volume heat exchanger 23, and then enters the shell side of the second volume heat exchanger 23 for further cooling the reactor effluent with the high temperature at the tube side of the second volume heat exchanger 23. The outlet at the shell side of the second volume heat exchanger 23 outputs the steam. The pressure of the steam is controlled (about 0.8 MPa) by the electrical adjusting valve V7. The flow rate of the softened water for generating the steam is controlled by the electrical adjusting valve V8. After the flow rate of the softened water entering the V8 is satisfied, the excess fluid outputted by the low-pressure frequency conversion pump 33 returns to the softened water tank 32 through an electrical adjusting valve V9.

Therefore, the softened water tank 32, the low-pressure frequency conversion pump 33, the second volume heat exchanger 23, and the third volume heat exchanger 24 are set in the system. Thus, the heat in the reactor effluent with the high temperature is able to be recovered and sold for benefits in a form of the steam, so this evidently decrease the operation cost of the whole system.

One skilled in the field will understand that the embodiment of the present invention as shown in the FIGURE and described above is exemplary only and not intended to be limited.

It will thus be seen that the objects of the present invention have been fully and effectively accomplished. Its embodiments have been shown and described for the purposes of illustrating the functional and structural principles of the present invention, and are subject to change without departure from such principles. Therefore, this invention includes all modifications encompassed within the spirit and scope of the following claims.

What is claimed is:

1. A supercritical water oxidation treatment system for organic wastewater with a high salinity comprising: a pre-desalination part, a supercritical water desalination part, a mix reaction part, and a separation recovery part:

wherein said pre-desalination part comprises a first tube heat exchanger and a second tube heat exchanger, wherein an inlet on a tube side of said first tube heat exchanger is injected with the wastewater with the high salinity, and an outlet on said tube side of said first tube heat exchanger is connected to an inlet of a cooling crystallization device, and a top outlet of said cooling crystallization device is connected to an inlet of a storage tank with organic wastewater, and a bottom outlet of said cooling crystallization device is connected to an inlet of a filter centrifuge, and a top outlet of said filter centrifuge is connected to said storage tank, and a bottom outlet of said filter centrifuge discharges salts; an glycol solution is injected through a shell side of said first tube heat exchanger and a shell side of said second tube heat exchanger, liquid oxygen is injected through an inlet on a tube side of said second tube heat exchanger;

said supercritical water desalination part comprises a heating furnace, an inlet of said heating furnace is connected to an outlet of said storage tank, and a middle outlet of said heating furnace is connected to an inlet of a hydrocyclone, and a top outlet of said hydrocyclone is connected to a middle inlet of said heating furnace, and an outlet of said heating furnace is connected to an inlet of a mixer, and then a bottom outlet of said hydrocyclone is connected to a desalination device;

said mix reaction part comprises a first volume heat exchanger, wherein an inlet on a tube side of said first volume heat exchanger is connected to an outlet on a tube side of a second volume heat exchanger, an outlet on said tube side of said first volume heat exchanger is connected to an inlet of a first buffer, an outlet of said first buffer is connected to an inlet of a mixer, an outlet of said mixer is connected to an inlet of a tubular reactor, an outlet of said tubular reactor is connected to an inlet on a tube side of a volume heat exchanger group;

said separation recovery part comprises a high-pressure gas-liquid separator, wherein an inlet of said high-pressure gas-liquid separator is connected to an outlet on said tube side of said volume heat exchanger group, and a top outlet of said high-pressure gas-liquid separator is connected to an inlet on a tube side of a fourth volume heat exchanger, and an outlet on said tube side of said fourth volume heat exchanger is connected to an inlet of a purification tower, and a top outlet of said purification tower is connected to an inlet of a second buffer, and an outlet of said second buffer is connected to an inlet of a high-pressure compressor, and an outlet of said high-pressure compressor is connected to said inlet of said first buffer; a bottom outlet of said high-pressure gas-liquid separator is connect to an inlet on a shell side of said first volume heat exchanger, and an outlet on said shell side of said first volume heat exchanger is connected to a post-treatment unit; an inlet on a shell side of said volume heat exchanger group is connected to a water softening device; an outlet on said shell side of said volume heat exchanger group outputs steam; an bottom outlet of said purification tower discharges $CO_2$.

2. The supercritical water oxidation treatment system, as recited in claim 1, wherein said water softening device comprises a softened water tank, and an outlet of said softened water tank is connected to said inlet on said shell side of said volume heat exchanger group through a low-pressure frequency conversion pump, and said outlet on said shell side of said volume heat exchanger group outputs the steam.

3. The supercritical water oxidation treatment system, as recited in claim 2, wherein said volume heat exchanger group comprises two volume heat exchangers connected in series.

4. The supercritical water oxidation treatment system, as recited in claim 1, wherein an buffer oxidizer is connected to said bottom outlet of said hydrocyclone, and a bottom outlet of said buffer oxidizer is connected to a top inlet of an expansion device, and a bottom outlet of said expansion device is connected to a top inlet of a salt storage pool, and a bottom outlet of said salt storage pool discharges inorganic salts.

5. The supercritical water oxidation treatment system, as recited in claim 1, wherein said bottom outlet of said high-pressure gas-liquid separator is connected to said inlet on said shell side of said first volume heat exchanger through a back pressure valve, an unsealed liquid tank and a low-pressure water pump.

6. The supercritical water oxidation treatment system, as recited in claim 1, wherein a sludge outlet end of said post-treatment unit is connected to said inlet of said storage tank through a linking pipe.

7. The supercritical water oxidation treatment system, as recited in claim 1, wherein said outlet on said tube side of said first volume heat exchanger is also connected to said top inlet of said buffer oxidizer.

8. The supercritical water oxidation treatment system, as recited in claim 1, wherein a top outlet of said buffer oxidizer is connected to said top outlet of said hydrocyclone.

* * * * *